United States Patent
Zoller, IV et al.

(10) Patent No.: US 11,979,455 B2
(45) Date of Patent: May 7, 2024

(54) INTELLIGENT RESOURCE BALANCING FOR VIRTUALIZED, DISTRIBUTED APPLICATIONS

(71) Applicant: Dell Products L.P., Round Rock, TX (US)

(72) Inventors: Linwood W. Zoller, IV, Lexington, KY (US); Daniel E. Cummins, Hudson, NH (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/815,053

(22) Filed: Jul. 26, 2022

(65) Prior Publication Data
US 2024/0039986 A1 Feb. 1, 2024

(51) Int. Cl.
*H04L 67/1008* (2022.01)
*H04L 67/1014* (2022.01)
*H04L 67/1097* (2022.01)

(52) U.S. Cl.
CPC ...... *H04L 67/1008* (2013.01); *H04L 67/1014* (2013.01); *H04L 67/1097* (2013.01)

(58) Field of Classification Search
USPC ........................................................ 709/226
See application file for complete search history.

(56) References Cited

U.S. PATENT DOCUMENTS

| | | | |
|---|---|---|---|
| 2006/0005189 A1* | 1/2006 | Vega | G06F 9/4856 718/1 |
| 2019/0286475 A1* | 9/2019 | Mani | G06F 9/45558 |
| 2022/0121470 A1* | 4/2022 | Saxena | G06F 9/5055 |

* cited by examiner

*Primary Examiner* — Moustafa M Meky
*Assistant Examiner* — Mohammad Yousuf A. Mian
(74) *Attorney, Agent, or Firm* — Jackson Walker L.L.P.

(57) ABSTRACT

A disclosed method provides a structured definition for a distributed application comprising two or more component applications. The definition may identify each component and a component type, e.g. VM or container, collocation information indicative of collocation requirements for one or more of the components, and external dependency information indicating constraints the alternative environment must comply with. The distributed application may be deployed to one or more endpoints. Responsive to detecting a triggering event for evaluation of component relocation alternatives, disclosed methods may invoke a resource balancing engine to identify a viable alternative endpoint for one or more component applications. Responsive to identifying a viable alternative endpoint for a particular component application, disclosed methods may relocate the particular component application to the alternative endpoint. The distributed application may be an HV application including one or more VM components and one or more container components.

16 Claims, 2 Drawing Sheets

INTELLIGENT RESOURCE BALANCING FOR VIRTUALIZED, DISTRIBUTED APPLICATIONS

TECHNICAL FIELD

The present disclosure relates to information handling system management and, more particularly, management of virtualized, distributed applications.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to run virtualized, distributed applications deployed with one or more virtual machines (VMs), one or more containers, or as hybrid virtualization (HV) applications using a combination of one or more VMs and one or more containers. Because VMs and containers are different constructs enabled by different technologies, HV applications may be less flexible with respect to at least some management tasks including, as an illustrative example, relocation of application components. For example, a VMware vSphere environment with Distributed Resource Scheduler (DRS) technology may be limited to host systems running VMware's hypervisor, ESXi. As another example, Kubernetes may be limited to scheduling pods, each of which runs one or more containers, to Kubernetes nodes within the same cluster. Such constraints could have a detrimental impact if, as just one example, a node on which a critical container was running required maintenance.

SUMMARY

Problems associated with balancing resources for HV and other heterogeneous applications running on potentially disparate endpoint environments with disparate runtime technologies are addressed by methods and systems in accordance with disclosed teachings for implementing autonomous application components and a holistic management approach with intelligence and automation based on user-defined intent stated in advance.

One or more methods disclosed herein provide an explicit definition for a distributed application, such as an ecommerce application, for example, that includes a plurality of component applications, e.g., a front end or web component, an inventory component, and so forth. The definition for the distributed application may include information identifying each component application, a component type corresponding to each component application, e.g., VM or container, and collocation information indicative of collocation requirements for one or more of the component applications. Disclosed methods may deploy the distributed application to one or more initial or original endpoints. Responsive to detecting a triggering event, disclosed methods may invoke a resource balancing engine to identify a viable alternative endpoint for one or more of the component applications. Responsive to identifying a viable alternative endpoint for a particular component application, disclosed methods may relocate the particular component application to the alternative endpoint.

The distributed application may be an HV application including one or more VM type component applications and one or more container type component applications. The definition file may include external dependency information for one or more of the component applications. The external dependency information for a component may indicate one or more constraints that the alternative endpoint must comply with. The resource balancing engine may identify the viable alternative endpoints based on various factors including, as examples, fleet information indicative of available endpoints and their capabilities and compliance information indicative of whether available endpoints satisfy each constraint identified in the dependency information.

A constraint may identify a required external resource, e.g., an external network file system (NFS) export, wherein the required external resource is accessible only from specified locations and, in such cases, the resource balancing engine may consider information indicating whether an otherwise viable endpoint supports access to the NFS export.

The event triggering the resource balancing engine may be any one or more of the following events: initiation of a maintenance event associated with an endpoint; detecting deployment of a higher priority application to the endpoint; and detecting a projected workload for the workload exceeding a threshold workload. Relocating a particular component application to an alternative may include hot migrating the particular component application to the alternative endpoint or redeploying the particular component application to the alternative endpoint. The particular component application may initially run on a first endpoint managed by a virtualization orchestrator or external compute environment and the alternative endpoint may be constrained to another endpoint managed by the virtualization orchestrator or external compute environment.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
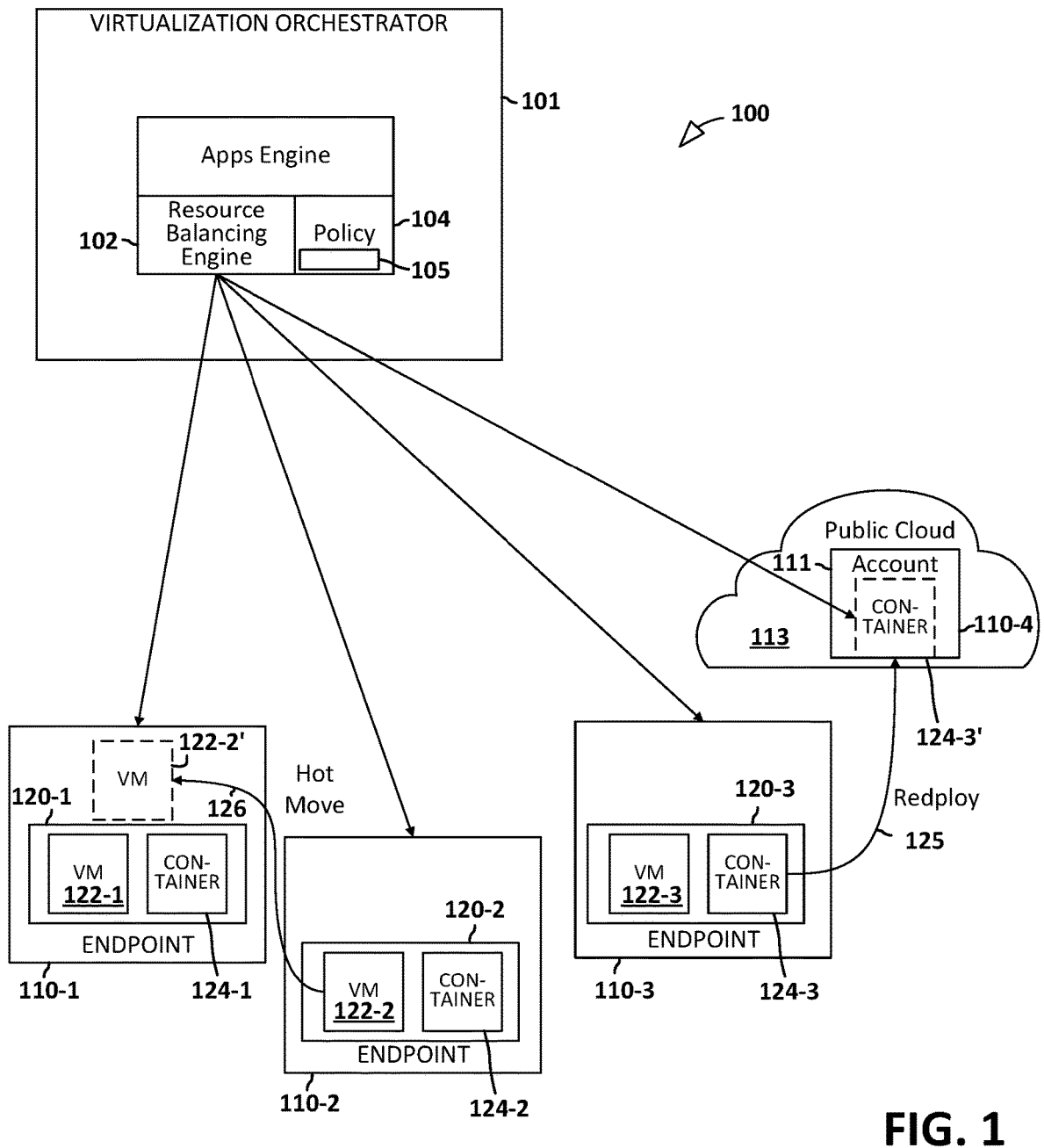
FIG. 1 illustrates a virtualization platform for managing distributed applications in accordance with disclosed teachings.
Figure 2:
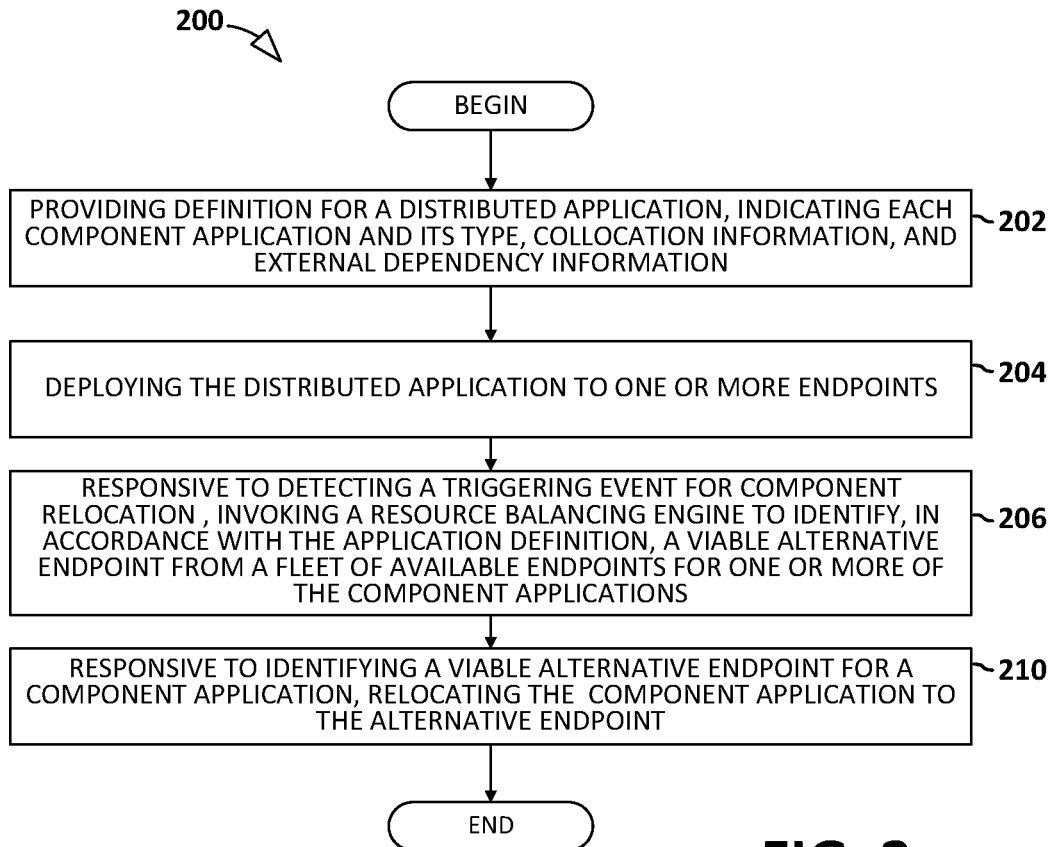
FIG. 2 illustrates a flow diagram of a method for managing a distributed application in accordance with disclosed teachings.
Figure 3:
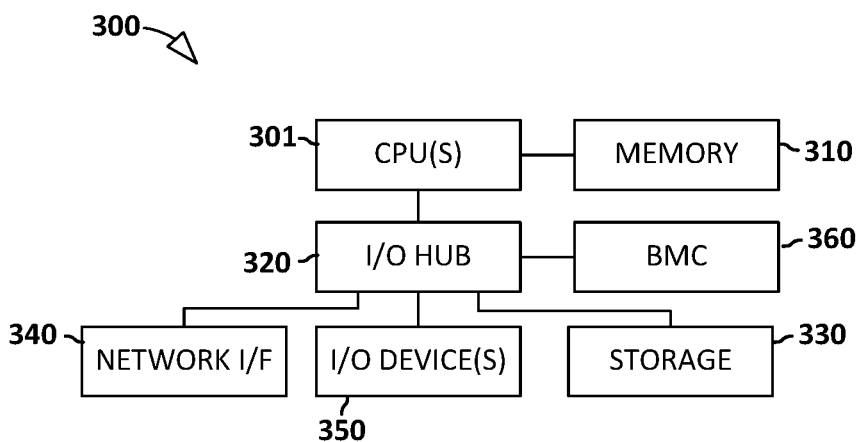
FIG. 3 illustrates an information handling system suitable for use in conjunction with disclosed teachings.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12". As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a virtualization platform 100 in accordance with disclosed teachings for monitoring virtualized, distributed applications, detecting predefined triggering events, performing policy-based evaluation and, when appropriate, initiation of hot moves, redeployments, or other types of relocation actions, for any one or more distributed application components.

The platform 100 illustrated in FIG. 1 includes a virtualization orchestrator 101 for intelligently deploying application components, e.g., VMs and/or containers, among a fleet of available platform endpoints 110, each of which is suitable for running VMs, containers, or both. The platform endpoints 110 illustrated FIG. 1 include customer-managed endpoints 110-1 through 110-3 and an external compute environment endpoint 110-4, but the illustrated implementation is an example and those of ordinary skill will readily appreciate that the platform 100 may include more, fewer, and/or a different group of endpoints.

FIG. 1 illustrates three deployments of a distributed application 120 that includes two components, a VM component 122 and a container component 124. FIG. 1 illustrates initial deployments of each application component in solid lines. Thus, both components of the first deployment 120-1 were initially deployed to first managed endpoint 110-1, both components of second deployment 120-2 were deployed to second managed endpoint 110-2, and both components of third deployment 120-3, were deployed to third managed endpoint 110-3.

At some point during runtime of the illustrated deployments applications, a triggering event for initiating a relocation evaluation was detected. The triggering event may have been initiation of a maintenance event associated with an endpoint, detecting deployment of a higher priority application to the endpoint, detecting a projected workload for the workload exceeding a threshold workload, or any of various other events that might suggest an alternative execution environment could potentially improve performance, reduce costs, or achieve one or more other desirable results.

The triggering event triggered a resource, depicted in FIG. 1 and identified as resource balancing engine (RBE) 102, to evaluate possible relocations of any one or more of the distributed application components 122 and 124. In at least some embodiments, RBE 102 is a global level resource balancer capable of assessing, in conjunction with a predefined policy 104, including a structured definition 105 of the distributed application 120 and a plurality of managed endpoints and connected external-compute environments, various scenarios for relocating application components from an initial environment to a second environment, either as hot live relocations (i.e., while the instance is running) or offline relocations (i.e., while the instance is offline) or via a redeployment (i.e., halt and destroy the existing instance and create a new instance).

In an illustrative example of disclosed features, application component VM 122 may correspond to a Kernel Virtual Machine (KVM) while the application component container 124 may correspond to a "bare" or "standalone" Open Container Initiative (OCI) container, i.e., not a container running under Kubernetes or another orchestration system. Using the structured definition 105 and knowledge of not only how the application was described and its dependencies but knowledge of the fleet of available endpoints, under direct management, and available external compute environments, and their respective capabilities, RBE 102, running in a centralized control plane, may determine whether the application can be hot live migrated, offline migrated (cold), or redeployed at another location. As depicted in FIG. 1, RBE 102 determined that container application 124-3 could be feasibly and beneficially redeployed (125) to a container 110-4 in a customer account 111 of public cloud 113. RBE 102 further determined that container application 124-2 could be feasibly and beneficially hot moved (126) to first management endpoint 110-1.

The structured definition 105 may include information identifying each application component and indicating a type for each component, e.g., VM type, container type, etc. In addition, the application definition may include affinity information indicating any constraints regarding where two components are deployed with respect to one another. For example, an affinity constraint may constrain RBE 102 from any deployment in which VM component 122 and container component 124 are not collocated, i.e., deployed to the same endpoint or endpoint cluster. In addition, structured definition 105 may also define external dependencies as constraints that an actual or proposed deployment must satisfy. An example of an external requirement is a requirement that a component be deployed to an endpoint or other environment that supports access to a particular Network File System (NFS) store or a particular external database.

Referring now to FIG. 2, a flow diagram illustrates a disclosed method 200 for managing a virtualized platform or environment including intelligent balancing of a fleet of platform endpoints available based on a structured definition of a distributed application that may include one or more VM components, one or more container components or a combination of one or more container components and one or more VM components. The method 200 illustrated in FIG. 2 includes providing (step 202) a structured definition for a distributed application. The definition indicates each component application and its type, collocation information for the component applications, and any external dependency information. Instances of the distributed application may be deployed (step 204) to one or more endpoints.

Responsive to detecting any of the previously described triggering events for component relocation, a resource balancing engine may be invoked (step 206) to identify, in accordance with the application definition, a viable alternative endpoint from a fleet of available endpoints for one or more of the component applications. Responsive to identifying a viable alternative endpoint for a component application, the illustrated method may relocate (step 210) the component application to the alternative endpoint.

Referring now to FIG. 3, any one or more of the elements illustrated in FIG. 1 through FIG. 2 may be implemented as or within an information handling system exemplified by the information handling system 300 illustrated in FIG. 3. The illustrated information handling system 300 includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
providing a definition for a distributed application comprising a plurality of component applications wherein the definition is indicative of:
each component application;
a component type corresponding to each component application wherein the component type is selected from a virtual machine (VM) type and a container type; and
collocation information indicative of collocation requirements for one or more of the components;
deploying the distributed application to one or more endpoints;
responsive to detecting a triggering event, invoking a resource balancing engine to identify a viable alternative endpoint for one or more of the component applications; and
responsive to identifying a viable alternative endpoint for a particular component application, relocating the particular component application to the alternative endpoint;
wherein the distributed application comprises a hybrid virtualization (HV) application, wherein the HV application includes one or more VM type components and one or more container type components, wherein the one or VM type components and the one or more container type components are distinct components.

2. The method of claim 1, wherein the definition for the distributed application includes external dependency information for one or more components, wherein the external dependency information for a component is indicative of one or more constraints that the alternative endpoint must comply with.

3. The method of claim 2, wherein the resource balancing engine identifies viable alternative endpoints based on one or more factors including:
fleet information indicative of available endpoints and their capabilities; and
compliance information indicative of whether available endpoints satisfy each constraint identified in the dependency information.

4. The method of claim 3, wherein at least one constraint identifies a required external resource wherein the required external resource is accessible only from specified locations.

5. The method of claim 4, wherein the required external resource comprises a network file system (NFS) export.

6. The method of claim 1, wherein the triggering event is selected from:
initiation of a maintenance event associated with an endpoint;
detecting deployment of a higher priority application to the endpoint; and
a projected workload for the workload exceeding a threshold workload.

7. The method of claim 1, wherein relocating the particular component application to the alternative endpoint comprises one of:
hot migrating the particular component application to the alternative endpoint; and
redeploying the particular component application to the alternative endpoint.

8. The method of claim 1, wherein the particular component application is originally running in a first endpoint managed by a virtualization orchestrator and wherein the alternative endpoint comprises a second endpoint managed by the virtualization orchestrator.

9. An information handling system comprising:
a central processing unit (CPU);
a computer readable memory including processor-executable instructions that, when executed by the CPU, cause the information handling system to perform operations including:
providing a definition for a distributed application comprising a plurality of component applications wherein the definition is indicative of:
each component application;
a component type corresponding to each component application wherein the component type is selected from a virtual machine (VM) type and a container type; and
collocation information indicative of collocation requirements for one or more of the components;
deploying the distributed application to one or more endpoints;
responsive to detecting a triggering event, invoking a resource balancing engine to identify a viable alternative endpoint for one or more of the component applications; and
responsive to identifying a viable alternative endpoint for a particular component application, relocating the particular component application to the alternative endpoint
wherein the distributed application comprises a hybrid virtualization (HV) applications wherein the HV application includes one or more VM type components and one or more container type components, wherein the one or VM type components and the one or more container type components are distinct components.

10. The information handling system of claim 9, wherein the definition for the distributed application includes external dependency information for one or more components, wherein the external dependency information for a component is indicative of one or more constraints that the alternative endpoint must comply with.

11. The information handling system of claim 10, wherein the resource balancing engine identifies viable alternative endpoints based on one or more factors including:
fleet information indicative of available endpoints and their capabilities; and
compliance information indicative of whether available endpoints satisfy each constraint identified in the dependency information.

12. The information handling system of claim 11, wherein at least one constraint identifies a required external resource wherein the required external resource is accessible only from specified locations.

13. The information handling system of claim 12, wherein the required external resource comprises a network file system (NFS) export.

14. The information handling, system of claim 9, wherein the triggering event is selected from:
initiation of a maintenance event associated with an endpoint;
detecting deployment of a higher priority application to the endpoint; and
a projected workload for the workload exceeding a threshold workload.

15. The information handling system of claim 9, wherein relocating the particular component application to the alternative endpoint comprises one of:
hot migrating the particular component application to the alternative endpoint; and redeploying the particular component application to the alternative endpoint.

16. The information handling system of claim 9, wherein the particular component application is originally running in a first endpoint managed by a virtualization orchestrator and wherein the alternative endpoint comprises a second endpoint managed by the virtualization orchestrator.

\* \* \* \* \*